United States Patent
Walsh et al.

(10) Patent No.: US 6,743,540 B2
(45) Date of Patent: Jun. 1, 2004

(54) METHOD AND APPARATUS FOR COLLECTING CONDENSATE IN AN INTEGRATED FUEL CELL SYSTEM

(75) Inventors: Michael M. Walsh, Fairfield, CT (US); Michael S. Zanoni, Glens Falls, NY (US); Robert A. Hoyt, Castleton, NY (US)

(73) Assignee: Plug Power Inc., Latham, NY (US)

( * ) Notice: Subject to any disclaimer, the term of this patent is extended or adjusted under 35 U.S.C. 154(b) by 41 days.

(21) Appl. No.: 10/210,004

(22) Filed: Jul. 31, 2002

(65) Prior Publication Data

US 2003/0118881 A1 Jun. 26, 2003

Related U.S. Application Data

(60) Provisional application No. 60/309,078, filed on Jul. 31, 2001.

(51) Int. Cl.[7] .................................................. H01M 8/04
(52) U.S. Cl. ............................... 429/25; 429/34; 429/38
(58) Field of Search ............................. 429/34, 38, 39, 429/26, 25, 22

(56) References Cited

FOREIGN PATENT DOCUMENTS

| JP | 61-216704 | * | 9/1986 | ........... B01D/19/10 |
| JP | 11-141898 | * | 5/1999 | ............. F24D/3/10 |

* cited by examiner

*Primary Examiner*—Stephen Kalafut
*Assistant Examiner*—Raymond Alejandro
(74) *Attorney, Agent, or Firm*—Trop, Pruner & Hu, P.C.

(57) ABSTRACT

The invention generally relates to a method and apparatus for collecting condensate from process streams in an integrated fuel cell system. In one aspect, the invention provides a water management subsystem for a fuel cell system. A gas conduit contains a gas at a first pressure. A water tank in the system contains water at a certain level. The water tank has an inlet orifice below the water level. A drain conduit has a first end and a second end. The drain conduit is connected at the first end to the gas conduit, and the drain conduit is connected at the second end to the inlet orifice of the water tank. The water level and the inlet orifice have a vertical height of water between them corresponding to a head pressure greater than the first pressure.

10 Claims, 4 Drawing Sheets

METHOD AND APPARATUS FOR COLLECTING CONDENSATE IN AN INTEGRATED FUEL CELL SYSTEM

CROSS REFERENCE TO RELATED APPLICATIONS

This application claims priority under 35 USC 119(e) from U.S. Provisional Application No. 60/309,078, filed Jul. 31, 2001, naming Walsh et al. as inventors, and titled "METHOD AND APPARATUS FOR COLLECTING CONDENSATE IN AN INTEGRATED FUEL CELL SYSTEM." That application is incorporated herein by reference in its entirety and for all purposes.

BACKGROUND

The invention generally relates to a method and apparatus for collecting condensate from process streams in an integrated fuel cell system.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

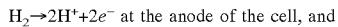
$H_2 \rightarrow 2H^+ + 2e^-$ at the anode of the cell, and

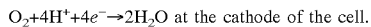
$O_2 + 4H^+ + 4e^- \rightarrow 2H_2O$ at the cathode of the cell.

A typical fuel cell has a terminal voltage of up to about one volt DC. For purposes of producing much larger voltages, multiple fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow field plates (graphite composite or metal plates, as examples) that are stacked one on top of the other. The plates may include various surface flow field channels and orifices to, as examples, route the reactants and products through the fuel cell stack. A PEM is sandwiched between each anode and cathode flow field plate. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow field channels and diffuse through the GDLs to reach the PEM. The PEM and its adjacent pair of catalyst layers are often referred to as a membrane electrode assembly (MEA). An MEA sandwiched by adjacent GDL layers is often referred to as a membrane electrode unit (MEU).

A fuel cell system may include a fuel processor that converts a hydrocarbon (natural gas or propane, as examples) into a fuel flow for the fuel cell stack. For a given output power of the fuel cell stack, the fuel flow to the stack must satisfy the appropriate stoichiometric ratios governed by the equations listed above. Thus, a controller of the fuel cell system may monitor the output power of the stack and based on the monitored output power, estimate the fuel flow to satisfy the appropriate stoichiometric ratios. In this manner, the controller regulates the fuel processor to produce this flow, and in response to the controller detecting a change in the output power, the controller estimates a new rate of fuel flow and controls the fuel processor accordingly.

The fuel cell system may provide power to a load, such as a load that is formed from residential appliances and electrical devices that may be selectively turned on and off to vary the power that is demanded by the load. Thus, the load may not be constant, but rather the power that is consumed by the load may vary over time and abruptly change in steps. For example, if the fuel cell system provides power to a house, different appliances/electrical devices of the house may be turned on and off at different times to cause the load to vary in a stepwise fashion over time. Fuel cell systems adapted to accommodate variable loads are sometimes referred to as "load following" systems.

Fuel cells generally operate at temperatures much higher than ambient (e.g., 50–80° C. or 120–180° C.), and the fuel and air streams circulated through the fuel cells typically include water vapor. For example, reactants associated with sulphonated fluorocarbon polymer membranes must generally be humidified to ensure the membranes remain moist during operation. In such a system, water may condense out of a process stream where the stream is cooled below its dew point. For example, if the anode and cathode exhaust streams are saturated with water vapor at the stack operating temperature, water will tend to condense from these streams as they cool after leaving the stack. Similarly, the humidity and temperature conditions of other process streams may also produce condensation. It may be desirable to remove condensate from a process stream in a fuel cell system process stream. As examples, such condensate can interfere with the flow of process streams, can potentially build to levels that can flood portions of the system, and can also cause problems if allowed to freeze (e.g., in an outdoor unit that is not in service).

The term "integrated fuel cell system" (also commonly referred to simply as "fuel cell system") generally refers to a fuel cell stack that is coupled to components and subsystems that support the operation of the stack. For example, this could refer to a fuel cell stack that is connected to a power conditioning device that converts direct current from the fuel cell into alternating current similar to that available from the grid. It might also refer to a system equipped with a fuel processor to convert a hydrocarbon (e.g., natural gas, propane, methanol, etc.) into a hydrogen rich stream (e.g., reformate) for use in the fuel cell. An integrated fuel cell system may also include a control mechanism to automate at least some portion of the operation of the system. Integrated fuel cell systems may include a single controller common to the entire system, or may include multiple controllers specific to various parts of the system. Likewise, the operation of integrated fuel cell systems may be fully or partially automated. Also, an integrated fuel cell system may or may not be housed in a common enclosure.

There is a continuing need for integrated fuel cell systems and associated process methods designed to achieve objectives including the forgoing in a robust, cost-effective manner.

SUMMARY

The invention generally relates to a method and apparatus for collecting condensate from process streams in an integrated fuel cell system. In one aspect, the invention provides a water management subsystem for a fuel cell system. A gas conduit contains a gas at a first pressure (e.g., a fuel cell system process stream such as a cathode or anode reactant stream). A water tank in the system contains water at a certain level. The terms water tank and water collection tank are used interchangeably in this context, and generally refer to any vessel adapted to accumulate water in the system. The water tank has an inlet orifice below the water level. A drain conduit has a first end and a second end. The drain conduit is connected at the first end to the gas conduit, and the drain conduit is connected at the second end to the inlet orifice of the water tank. The water level and the inlet orifice have a vertical height of water between them corresponding to a head pressure greater than the first pressure. In this context, it will be appreciated that head pressure refers to the pressure exerted by a vertical column of water.

Various embodiments of the invention can include additional features, either alone or in combination. For example, the system can further include a water level sensor adapted to measure the water level. The water tank can have a second inlet orifice, and have a water supply (e.g., a municipal water line) connected to the second inlet orifice. A controller can be connected to the water level sensor, being adapted to feed water to the tank from the water supply when the sensor indicates the water level is below a predetermined threshold. For example, it may be desirable to keep a level of water in the tank such that the pressure at the inlet orifice leading to the drain conduit is greater than the pressure of the gas in the gas conduit (e.g., to prevent the gas from blowing into the water tank).

In some embodiments, a water level sensor is provided to measure the water level. The water tank has a drain (e.g., to the sewer), and a controller is connected to the water level sensor, such that the drain is opened when the sensor indicates the water level is above a predetermined threshold, and the drain is closed when the sensor indicates the water level is below a predetermined threshold.

An examples, the gas conduit can be an anode tailgas oxidizer, or a conduit associated with an anode tailgas oxidizer such as an inlet stream or exhaust stream. The gas conduit can also be an anode fuel outlet conduit of a fuel cell, or an anode fuel inlet conduit of a fuel cell.

In some embodiments, the water tank can include a gas inlet and a gas vent, wherein at least a portion of a cathode inlet air stream of a fuel cell is circulated through the water tank from the gas inlet to the gas vent. As an example, such an arrangement may be desired to continually flush the atmosphere in the water tank of any combustible components that might otherwise accumulate. In some embodiments, a cathode exhaust stream is circulated through the water tank instead. In some embodiments, such a gas vent is in fluid communication with an air inlet of an oxidizer. For example, the air purged from the water tank can be used to provide oxygen to the ATO.

In another aspect, the invention provides a water management subsystem for a fuel cell system that has a gas conduit containing gas at a first pressure. A water collection tank contains water and an atmosphere (i.e., the gas above the water level). The tank has an inlet orifice below the water level in the tank. The atmosphere of the tank has a second pressure. A drain conduit, having a first end and a second end, is connected at the first end to the gas conduit, and is connected at the second end to the inlet orifice of the water collection tank.

The water level and the inlet orifice have a vertical height of water between them corresponding to a head pressure, and the sum of the second pressure and the head pressure is greater than the first pressure. In this arrangement, condensate in the gas conduit is allowed to drain into the water tank through the drain conduit. Since the pressure at the tank inlet orifice is greater than that of the gas conduit, the gas in the gas conduit is not allowed to blow through the water tank.

In another aspect, the invention provides another water management subsystem for a fuel cell system. A gas conduit contains a gas at a first pressure. A water collection tank contains water and an atmosphere, the water having a level within the tank, the water collection tank having an inlet orifice above the water level, and the tank atmosphere having a second pressure. A drain conduit has a first end and a second end, and the drain conduit is connected at the first end to the gas conduit, and is connected at the second end to the inlet orifice of the water collection tank. A portion of the drain conduit forms a water trap bend (e.g., a "j-trap" or "p-trap" or other similar arrangement). The water trap bend contains water, and has a vertical height corresponding to a head pressure. The sum of the second pressure and the head pressure is greater than the first pressure.

In another aspect, the invention provides a method of water management for a fuel cell system, including at least the following steps: (1) flowing a fuel cell process stream containing liquid water through a gas conduit at a first pressure; (2) draining the liquid water from the gas conduit into a drain conduit; (3) draining the liquid water through the drain conduit into an inlet orifice of a water collection tank, wherein the inlet orifice is located below a water level of the water collection tank; and (4) maintaining the water level of the water collection tank such that a second pressure of water at the inlet orifice is greater than the first pressure of the process stream.

Some embodiments may include additional steps, either alone or in combination. For example, an additional step may include circulating air through the water collection tank, or circulating a cathode exhaust stream from a fuel cell through an atmosphere of the water collection tank to an oxidizer. Embodiments of methods under the invention may also refer to any of the systems and combinations of features described herein.

In another aspect, the invention provides a method of water management for a fuel cell system, including at least the following steps: (1) flowing a fuel cell process stream containing liquid water through a gas conduit at a first pressure; (2) draining the liquid water from the gas conduit into a drain conduit; (3) draining the liquid water through the drain conduit into an inlet orifice of a water collection tank, wherein the inlet orifice is located above a water level of the water collection tank; and (4) maintaining the water level of the water collection tank such that a second pressure of water at the inlet orifice is greater than the first pressure of the process stream.

Advantages and other features of the invention will become apparent from the following description, drawings and claims.

DETAILED DESCRIPTION

Figure 1:
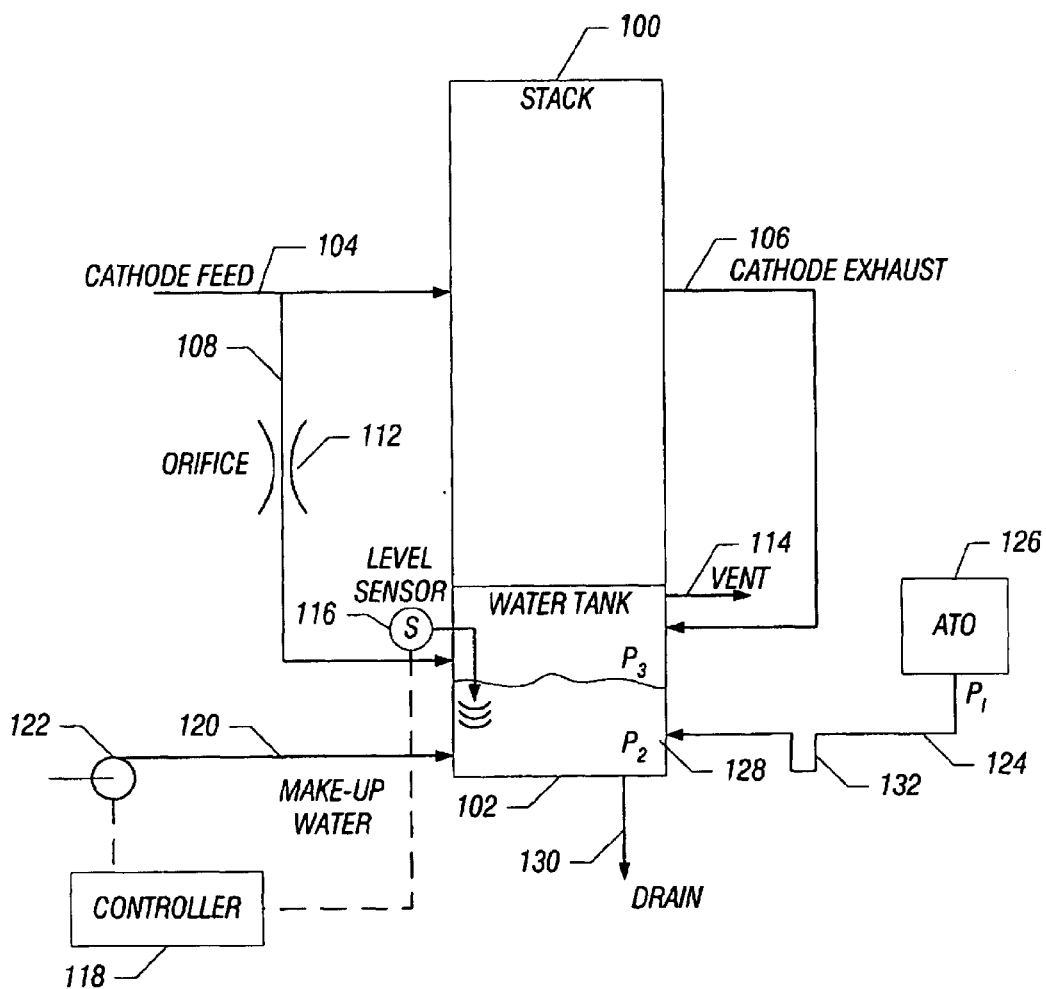
FIG. 1 is a schematic representation of an apparatus for collecting condensate in an integrated fuel cell system.

In general, in one embodiment, the invention provides a water management subsystem for a fuel cell system. A gas conduit is operated at a first pressure, and is associated with a water collection tank containing a level of water. A drain line is connected to the gas conduit to allow condensate to drain from the gas conduit. The drain line is connected to the water tank at an inlet orifice of the tank. The inlet orifice is located below the water level of the tank. The connection of the drain line to the gas conduit is located either above the tank, or above the water level in the tank. The height of water in the tank provides a pressure at the bottom of the tank. The water level is set such that the pressure at the inlet orifice is greater than the pressure of the gas conduit. It will be appreciated that this pressure relationship allows water to drain into the water tank as the level of water in the drain line rises to a level above the water level in the tank. This arrangement thereby allows draining of condensate from the gas conduit while preventing gas from the gas conduit from blowing into the tank. This arrangement also eliminates the need for float valves (see below) or other devices for separating condensate from a gas stream.

In another embodiment of the invention, the water tank is maintained partially full, and the atmosphere in the tank above the water level is maintained at a pressure such that the pressure at the inlet orifice under the water level is greater than the pressure of the gas conduit. In some embodiments, the pressure of the atmosphere is maintained by circulating a process stream through the water tank. For example, the cathode feed or exhaust streams may be circulated through the tank.

In another embodiment, the water tank includes a second inlet orifice connected to a water supply. The water supply can be a pump, reservoir, pressurized line or other arrangement adapted to supply water to the tank when desired. The water tank further includes a level sensor connected to the water supply (e.g., via a pump or valve) such that control of the water level in the tank is automated. The level sensor can also be connected to a system controller (e.g., programmable circuitry) that in turn controls the water supply according to a signal from the level sensor.

In another embodiment, a method of fuel cell system water management is provided. The steps include: (1) flowing a fuel cell process stream containing liquid water through a gas conduit at a first pressure; (2) draining a portion of the liquid water from the gas conduit into a drain conduit; (3) draining the liquid water through the drain conduit into an inlet orifice of a water collection tank, wherein the inlet orifice is located below a water level of the water collection tank; and (4) maintaining the water level of the water collection tank such that a second pressure of water at the inlet orifice is greater than the first pressure of the process stream.

In another embodiment, the method can further include flowing a cathode exhaust stream through an atmosphere of the water tank. The method can also include maintaining a pressure of the atmosphere such that the pressure at the inlet orifice under the water level is greater than the pressure of the gas conduit.

Referring to FIG. 1, a fuel cell stack 100 is shown associated with a water tank 102. The stack 102 includes a inlet gas conduit 104 for feeding cathode gas to the stack 100, and an outlet gas conduit 106 for exhausting the cathode gas from the stack 100. The inlet conduit 104 is connected to the water tank 102 via drain line 108. The outlet gas conduit 106 is also connected to the water tank 102. Orifice 112 limits the amount of cathode gas that is bled from the inlet conduit 104 to the water tank 102. The water tank 102 includes a vent 114 through which the gas exits as it circulates through the tank 102. The vent 114 can exhaust to the ambient atmosphere, or can be fed to another part of the system, such as an anode exhaust gas combustor 126 (also referred to as "anode tailgas oxidizer" or ATO). Some embodiments may not include a vent. The water tank 102 includes a level sensor 116 adapted to measure the water level in the tank. The tank further includes a make-up water line 120 that is driven by a pump 122, and a drain 130. The sensor 116 is connected to a controller 118 (e.g., a programmable circuit) that is connected to the pump 122. The controller 118 automatically maintains a desired level of water in the tank 102. In the embodiment shown in FIG. 1, a condensate drain line 124 connects the ATO 126 to the water tank 102.

The drain line 124 feeds into the water tank 102 at an inlet orifice 128. The inlet orifice 128 is located under the level of water in the tank 102. The atmosphere in the tank has a pressure P3 and the inlet orifice 128 has a pressure P2. The pressure P2 is greater than a pressure P1 of the ATO drain line. In some embodiments, a drain line such as line 124 can originate from a position above the water tank 102, and extend down to a position below the water tank 102 before running back up to its inlet orifice 128. In such arrangements, it may be more difficult for gas to blow through the line, either from the drain line or from the water tank should the level run low, since a "j-trap" arrangement is provided with a larger column of water than an arrangement relying on the tank water level alone.

In another embodiment based on the system described in FIG. 1, the inlet orifice 128 is located above the water level in the tank. The j-trap feature 132 (generally an optional feature, also referred to in some cases as a "water trap bend") ensures that an amount of condensate remains in the drain line 124 so that gas does not blow through the line 124 into the tank 102. Again, drain line 124 may represent a drain line from any process stream, not just one from ATO 126. As discussed above, the height of the j-trap feature 132 may be selected based on the pressures P1 or P3, or as otherwise desired. Placing the inlet orifice 128 above the water level provides an advantage in systems where a hot ATO 126 may be fluidly isolated when it is shut down and will tend to pull a vacuum as it cools. In some systems, such a vacuum might cause water from tank 102 to backup through drain line 124, potentially flooding the system or causing other problems. Similarly, in systems where condensate is drained from anode or cathode inlets or outlets to the stack (whether passed through a float valve or not see below), it may be desirable to provide a drain line on such streams with a j-trap feature that empties into the tank at a point above the water level. This is because fuel cell stacks are typically fluidly isolated when they are shut down, and may produce vacuums as they cool. The j-trap features previously described can be integral to the water tank or a stack manifold including a water tank, or may consist of a simple j-trap bend in the drain line plumbing.

Figure 2:
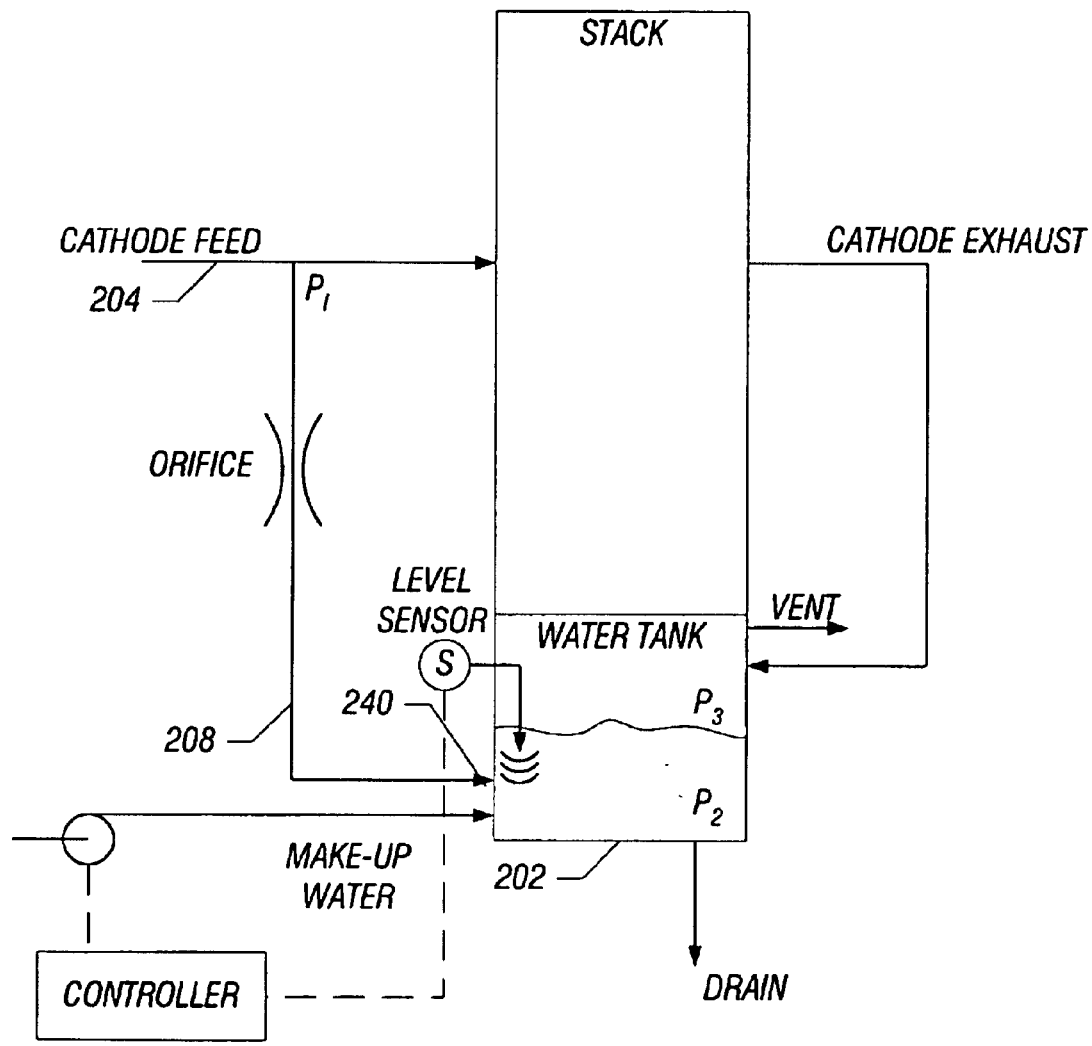
FIG. 2 is a schematic representation of an apparatus for collecting condensate in an integrated fuel cell system.

Referring to FIG. 2, the system of FIG. 1 is modified in that the conduit 208 off the cathode feed conduit 204 is connected to the water tank 202 at an inlet orifice 240 below the water level in the tank 202. Thus, in this embodiment, the cathode feed conduit 204 is not used to circulate air through the water tank 202. Rather, conduit 208 serves as a condensate drain line. The pressure at the inlet orifice 240 is greater than the pressure of the cathode feed conduit 204, due to the water level in the tank 202 and the pressure of the atmosphere in the tank 202.

Figure 3:
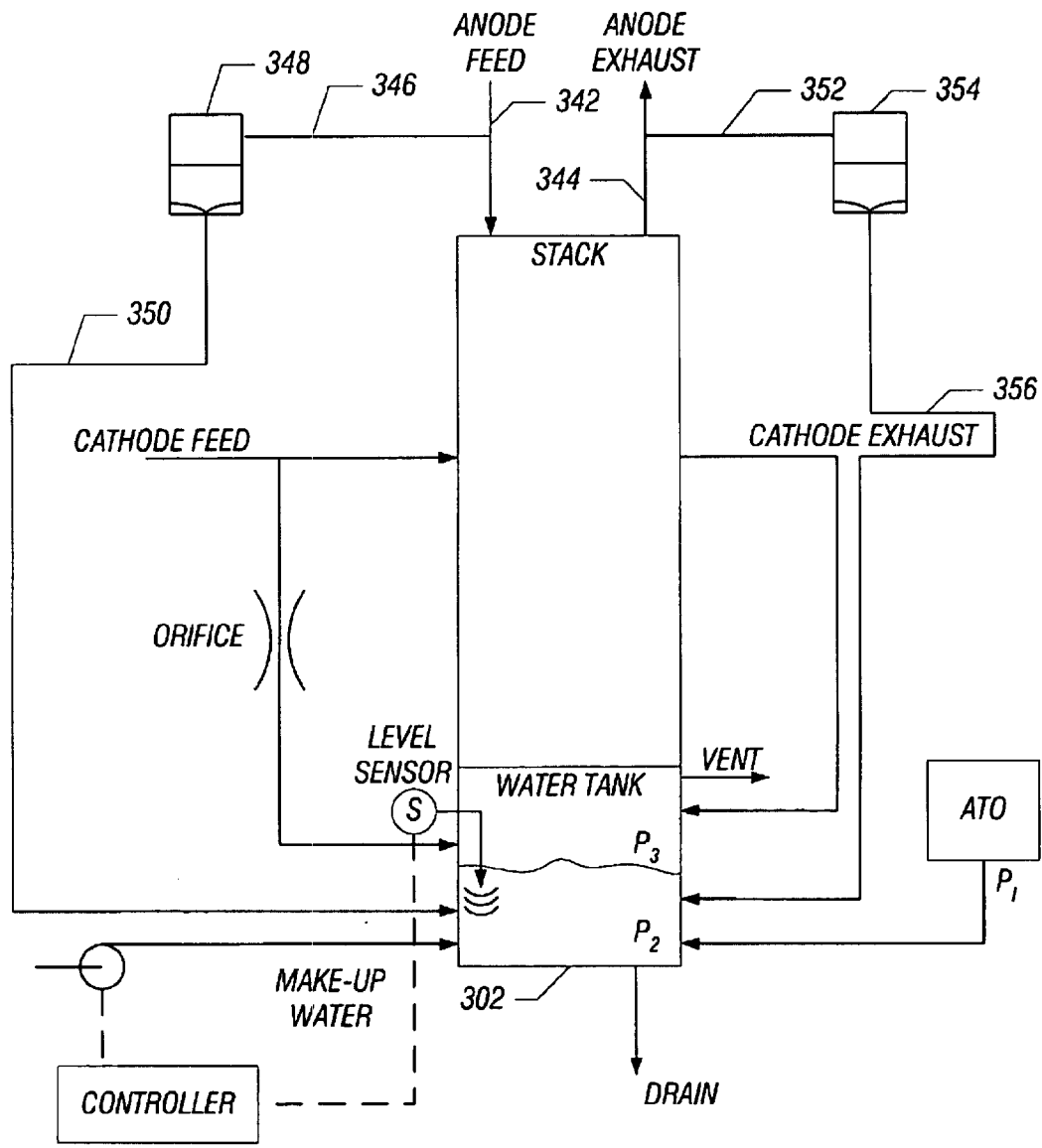
FIG. 3 is a schematic representation of an apparatus for collecting condensate in an integrated fuel cell system.

Referring to FIG. 3, the system of FIG. 1 further includes anode gas feed conduit 342 and exhaust conduit 344. Drain line 346 allows condensate to drain from conduit 342 into water trap 348. Water trap 348 is essentially a gravity-biased float valve wherein water entering the trap causes a float valve to open as it floats away from a drain orifice. When there is no water in the trap 348, the float valve is closed such that gas is prevented from flowing through the trap 348. Such devices are well known in the art. The water trap 348 is connected to drain line 350 that feeds condensate to the tank 302. Similarly, anode exhaust conduit 344 is connected to drain line 352 which leads to water trap 354. Drain line 356 allows condensate to flow from water trap 354 to the tank 302.

In some embodiments, it may be preferable that gas conduits that contain combustible gasses such as the anode feed 342 and the anode exhaust 344 are not drained directly into the water tank 302. Water traps such as 348 and 354 are used to limit the exposure of the water tank to such streams. One concern is that combustible gasses can dissolve into water and accumulate in gas pockets as the water temperatures fluctuates. Such gas pockets can pose safety problems such as the threat of explosions, etc. This is one reason that the atmosphere of the tank may be continually purged in some embodiments with an air stream. It may be preferable, therefore, to provide water traps on drain lines running off process streams that contain combustible gasses, while drain lines from non-combustible process streams are not provided with water traps. In other embodiments, as an example, the atmospheric purge of the water tank may be sufficient to prevent any buildup of combustible gasses in the tank such that devices such as water traps 348 and 354 can be eliminated. In other words, in some cases the term "gas conduit" may refer to a non-combustible process stream, while in other embodiments the term may refer to any gaseous process stream in the fuel cell system.

Figure 4:
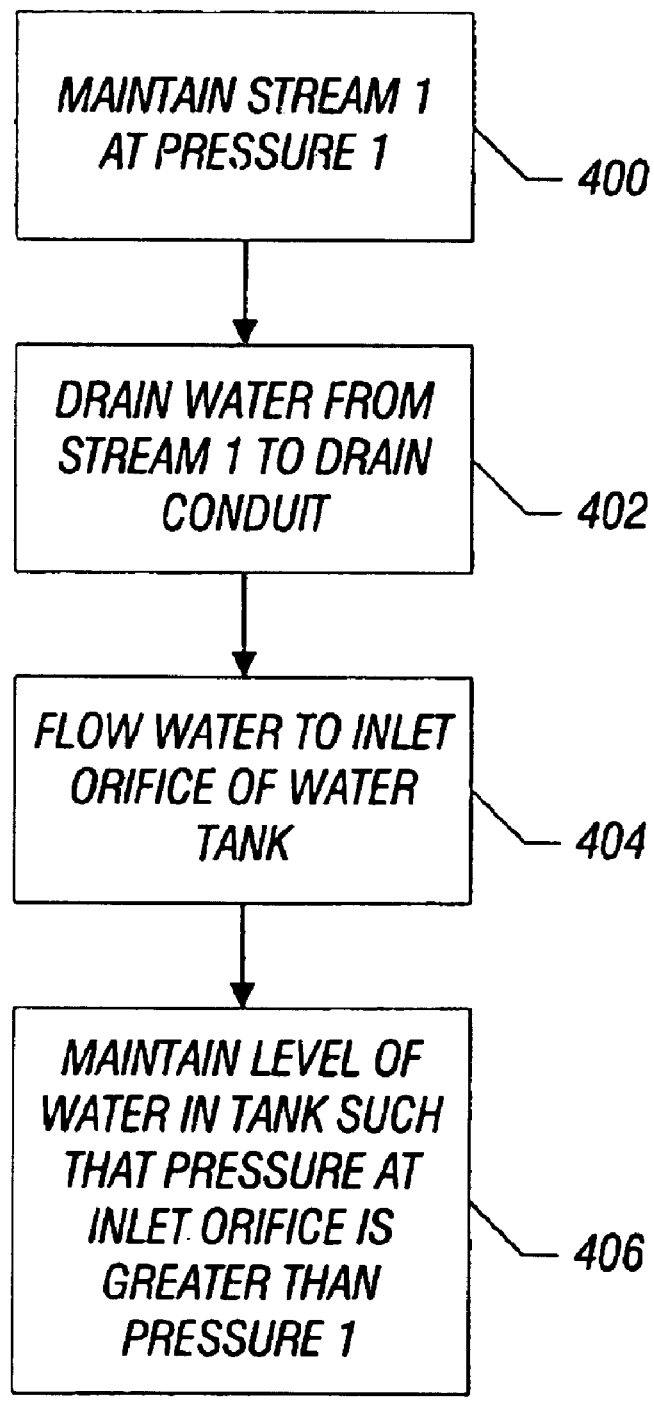
FIG. 4 is a flow chart of a method for collecting condensate in an integrated fuel cell system.

Referring to FIG. 4, a method of fuel cell system water management is provided. The steps include: (400) flowing a fuel cell process stream containing liquid water through a gas conduit at a first pressure; (402) draining a portion of the liquid water from the gas conduit into a drain conduit; (404) draining the liquid water through the drain conduit into an inlet orifice of a water collection tank, wherein the inlet orifice is located below a water level of the water collection tank; and (406) maintaining the water level of the water collection tank such that a second pressure of water at the inlet orifice is greater than the first pressure of the process stream.

Further embodiments of the invention may include apparatus and methods based on any combination of the features and aspects described above.

While the invention has been disclosed with respect to a limited number of embodiments, those skilled in the art, having the benefit of this disclosure, will appreciate numerous modifications and variations therefrom. It is intended that the invention covers all such modifications and variations as fall within the true spirit and scope of the invention.

What is claimed is:

1. A' system, comprising:
   a fuel cell stack associated with a gas;
   a gas conduit containing the gas at a first pressure;
   a water tank containing water, the water having a level within the tank, the water tank having an inlet orifice below the water level;
   a drain conduit having a first end and a second end, the drain conduit being connected at the first end to the gas conduit, the drain conduit being further connected at the second end to the inlet orifice of the water tank; and
   wherein a spacing between the inlet orifice and the water level is such that the water in the water tank exerts a head pressure at the inlet orifice greater than the first pressure of the gas in the conduit.

2. The system of claim 1, further comprising:
   a water level sensor adapted to measure the water level;
   the water tank having a second inlet orifice;
   a water supply connected to the second inlet orifice of the water tank; and
   a controller connected to the water level sensor, the controller being adapted to feed water to the tank from the water supply when the sensor indicates the water level is below a predetermined threshold.

3. The system of claim 1, further comprising:
   a water level sensor adapted to measure the water level;
   the water tank having a drain;
   a controller connected to the water level sensor, the controller being adapted to open the drain when the sensor indicates the water level is above a predetermined threshold, the controller being further adapted to close the drain when the sensor indicates the water level is below a predetermined threshold.

4. The system of claim 1, wherein the gas conduit comprises an anode tailgas oxidizer.

5. The system of claim 1, wherein the gas conduit comprises an anode fuel outlet conduit of a fuel cell.

6. The system of claim 1, wherein the gas conduit comprises an anode fuel inlet conduit of a fuel cell.

7. The system of claim 1, wherein the water tank further comprises a gas inlet and a gas vent, wherein at least a portion of a cathode inlet air system of a fuel cell is circulated through the water tank from the gas inlet to the gas vent.

8. The system of claim 7, wherein the gas vent is in fluid communication with an air inlet of an oxidizer.

9. The system of claim 1, wherein the water tank further comprises a gas inlet and a gas vent, wherein at least a portion of a cathode exhaust air stream of a fuel cell is circulated through the water tank from the gas inlet to the gas vent.

10. The system of claim 9, wherein the gas vent is in fluid communication with an air inlet of an oxidizer.

* * * * *